United States Patent [19]
Hurley et al.

[11] Patent Number: 5,919,530
[45] Date of Patent: Jul. 6, 1999

[54] PROCESS FOR PRODUCING CUSTOMIZED THERMOPLASTIC RESINS

[75] Inventors: James M. Hurley, Grosse Ile; Bernd B. Brian, Plymouth; Mary E. Tuttle, Trenton; Bill Popovski, Warren, all of Mich.

[73] Assignee: BASF Corporation, Mt. Olive, N.J.

[21] Appl. No.: 08/884,803

[22] Filed: Jun. 30, 1997

[51] Int. Cl.$^6$ ........................................... B05D 3/06
[52] U.S. Cl. ........................... 427/557; 156/60; 264/175; 264/176.1; 264/464; 264/468; 427/185; 427/213; 427/222; 427/374.2; 427/398.1; 427/421; 427/430.1; 427/553; 427/591; 427/595
[58] Field of Search ........................ 427/222, 185, 427/213, 421, 430.1, 553, 591, 595, 557, 374.2, 398.1; 156/60; 264/175, 176.1, 464, 468

[56] References Cited

U.S. PATENT DOCUMENTS

| | | | |
|---|---|---|---|
| 5,006,368 | 4/1991 | Louks | 427/189 |
| 5,236,649 | 8/1993 | Hall et al. | 264/130 |
| 5,248,550 | 9/1993 | Turpin et al. | 428/278 |
| 5,662,963 | 9/1997 | Hishida | 427/212 |
| 5,688,449 | 11/1997 | Fox | 264/54 |

*Primary Examiner*—Bernard Pianalto
*Attorney, Agent, or Firm*—James J. Drake

[57] ABSTRACT

Disclosed is a method for customizing a thermoplastic resin in which a thermoplastic resin body is at least partially coated with a thermoplastic coating composition comprising an additive component and a polymeric component. The thermoplastic resin body is at a temperature that is above the onset temperature of the melt processing range of the coating composition. After the coating is applied, the resin body is cooled to solidify the coating composition. Customized thermoplastic resins may be produced more efficiently using the present method than by conventional methods. The customized thermoplastic resins produced according to the invention may be heated to above the onset temperature of the melt processing range of the resin body, mixed to form a substantially uniform mixture and formed into an article.

45 Claims, No Drawings

PROCESS FOR PRODUCING CUSTOMIZED THERMOPLASTIC RESINS

FIELD OF THE INVENTION

The present invention relates to colored thermoplastic resins that are useful for molding articles. In particular, the invention relates to customized thermoplastic resins that have a thermoplastic resin body, or base resin, coated with a layer of a lower melting thermoplastic coating composition. The coating composition comprises a polymeric component and at least one additive, preferably a colorant or pigment, and particularly preferably an additive not present in the thermoplastic resin body composition. In a preferred embodiment, the coating contains as an additive a pigment that is dispersed in the polymeric component. The customized thermoplastic resin is formed into an article by melting and mixing together the thermoplastic resin body and the thermoplastic coating compositions and extruding, molding, or otherwise shaping the blend into the article.

BACKGROUND AND SUMMARY OF THE INVENTION

Thermoplastic resins are formed into many kinds of articles, for example by extrusion, thermoforming, and compression molding processes. The thermoplastic resins are usually compounded and manufactured as pellets or powders that may be easily shipped and that may be easily and conveniently handled during formation of the desired articles or stored for later processing. It is most economical to manufacture the thermoplastic resins as pellets in a continuous extrusion process in which the pellets are compounded to meet the requirements of many uses.

It is often the case, however, that a thermoplastic resin must be specially formulated or customized for a particular use or application, such as mold-in color processes, for example by including special additives for that use, such as pigments to achieve a particular color or a stabilizer package that meets the requirements of a particular use. In particular, thermoplastic resins may be customized to include certain pigments and/or colorants. It is often desirable that the manufactured article have a particular color. A particular color may, for example, enhance aesthetic appeal of the article or may even serve to help identify the particular brand or manufacturer.

Customizing the color or additive package of thermoplastic resins can, however, present problems. While the general purpose thermoplastic resin, or base resin, may be produced by continuous extrusion operations, colored thermoplastic resins or thermoplastic resins with special additive packages are typically required in much smaller amounts that are relatively expensive to produce. Manufacture, especially post-production cleaning, is extremely labor instensive. The processing equipment (such as blenders, feeders, extruders, and pelletizing equipment) must be thoroughly cleaned after each particular color or customized blend in order to avoid contamination of the thermoplastic resins that will next be produced in the equipment. The cleaning process requires significant down time of the equipment during which no material is being manufactured, adding to the manufacturing costs of the specialized product.

Alternatively, colored articles have been produced by dry blending the uncolored thermoplastic resin with a color concentrate (also known as color masterbatch) in what is known in the art as a "salt and pepper blend." The thermoplastic resin and the color concentrate used for such blends are typically of similar size pellets or pieces. The color concentrate is usually a minor amount by weight of the blend, typically only up to about 5% by weight, and often much less. The salt and pepper blend is then introduced directly to the molding or forming equipment used to produce the final article. The melt blending of the uncolored resin and the color concentrate must take place in the molding or forming equipment. This process, however, can result in color variations from piece to piece, or even in areas within the same piece, because of incomplete blending, particularly for low blending ratios of the color concentrate. Segregation of particular additives during packaging and transportation may also be experienced with dry blends and contribute to lack of homogeneity in the final formed articles.

In a method related to the use of a salt and pepper blend, lakes and liquid colors can be introduced at the mouth of an injection molding extruder or into other forming equipment. This method also has a number of drawbacks. In the first place, sophisticated metering equipment may be required by the fabricator in order to produce uniform coloration. In the second place, this method is similar to the salt and pepper method in that the coloring material and the uncolored resin are introduced essentially separately, relying on a thorough mixing in the forming equipment before the article is finally shaped. Incomplete blending and color variations can easily result.

Gose et al., in U.S. Pat. No. 5,443,910 and related patents, describe applying certain processing, stabilizing, or other functional polymer additives to polymeric particles by spraying the particles with an aqueous emulsion of the polymer additive. The emulsion includes an emulsifiable (acid-functional) wax, surfactant, a base, the additive, and the water. This method of customizing thermoplastic resins, however, has several drawbacks. First, the inclusion of a base compound in the applied material may cause unwanted coloration or color shifts. For example, Gose et al. note a problems when potassium hydroxide or sodium hydroxide is used. It is also well-known that discoloration may result from amines in certain systems. Secondly, the water of the emulsion, or the combination of water and base, present problems for hydrophilic resins. In addition, it may be desirable in some instances to exclude surfactants from the thermoplastic resin. Finally, the emulsion application method has drawbacks that are inherent in the process, for instance, that the applied layer of emulsion must be dried and the emulsion must be stored and used under carefully maintained conditions to prevent destabilization and separation.

Sharma, in U.S. Pat. No. 5,300,256 and related patents, also describes applying an additive to a polymeric particle from an aqueous medium. Sharma discusses the handling and storage problems of the Gose and provides a solid two-phase additive system that can be dispersed in water just prior to application. The polymer additives used by Sharma must melt at a temperature no higher than 100° C., and may include hydrophilic polymers such as low molecular weight polyolefins with carboxylic moieties. The additives again contain water and are further diluted with water and applied as an aqueous emulsion, still with many of the attendant problems as mentioned above.

It is also known to prepare color concentrates by a method of blending together a mixture of pigment, low molecular weight polyethylene wax, and thermoplastic polyolefin granules. The pigment and wax is included at relatively high levels, for example approximately 40% by weight of the mixture. The wax dispersed the pigment forms a layer on the polymer granules. This masterbatch is blended with unmodified base polyolefins to form a "salt and pepper" blend. The high loading of pigment and dispersing wax is required by the masterbatch in order to achieve the desired final pigment loading in the salt and pepper blend. Such masterbatch-containing blends suffer from the same problems discussed above. In addition, the relatively thick coating of wax on the granules is undesirable for the reason that such thick coatings tend to easily chip and flake off, which could result in segregation and nonhomogeneity in the molded articles, as well as dust problems in production.

Thus, it would be desirable to provide a customized thermoplastic resins that overcomes the drawbacks of the those produced by the methods described above.

We have now discovered a novel method of preparing customized thermoplastic resins in which the pieces, typically pellets, of thermoplastic resin are coated with a coating that comprises a polymeric component and an additive component. The polymeric component of the coating has a melting point, softening point, or glass transition temperature that is lower than the melting point, softening point, or glass transition temperature of the thermoplastic resin body. The above-mentioned melting point, softening point, or glass transition temperature (or other temperature or temperature range where the resin begins to soften or flow) of a particular resin or resin composition may conveniently be termed the onset temperature of the melt processing range. It will be appreciated by the skilled artisan that the term "onset temperature for the melt processing range" is used herein for convenience, and that it may refer to either a single distinct temperature or to a range of temperatures. In referring to differences between ranges, one may employ the difference of the highest, lowest, or average temperature within a range; the term preferably employs the most meaningful separation of temperature in the application under consideration.

In a preferred embodiment, the coating is a color concentrate comprising a polymeric component and one or more pigments, optionally with other additives. In a process for producing the customized thermoplastic resins of the invention, the thermoplastic resin body or piece is contacted with the coating at a temperature at which the coating composition is a melt. The coated resin pieces or pellets are cooled to solidify the coating in a layer on the thermoplastic resin body. In a preferred embodiment, a substantially even thickness of an outer layer of the customizing coating is applied. The coated resin pieces or pellets are easy to handle and may be formed into articles using the same processes and in the same way as would resin pellets that have had the color or other additive integrally mixed in.

The color concentrate or other customizing coating composition is coated onto the resin after the resin piece is formed. The customized thermoplastic resins of the invention may thus be produced in easy-to-clean equipment and without requiring down time of the equipment used to manufacture the thermoplastic resin body, resulting in a much more versatile and economical process. In addition, because each pellet or other body of the thermoplastic resin is in intimate contact with the pigment or additive necessary to produce the desired customized resin, defects such as inhomogeneity, which are especially apparent when color is involved, are avoided. Further, the surfactants, water, amines, and resins with hydrophilic functionalities required by the prior art compositions are not necessary for the coatings of the present invention.

In particular, the present invention provides for a customized thermoplastic resin that has a thermoplastic resin body and an outer thermoplastic coating layer, covering at least a portion of the body, comprising a polymeric component and an additive component. It is particularly preferred that the additive is a pigment.

DETAILED DESCRIPTION

The customized thermoplastic resins of the invention have a thermoplastic resin body and an outer thermoplastic coating layer that at least partially covers the body. The coating includes a polymeric component that has an onset temperature for its melt processing range that is lower than the onset temperature of the melt processing range of the thermoplastic resin body. The coating also includes an additive component comprising at least one additive. Preferably, the additive component comprises at least one colorant or pigment as the additive or as one of a plurality of additives.

The thermoplastic resin body is preferably a pellet. Thermoplastic resins are customarily manufactured as pellets for later processing into the desired article. The term "pellets" is understood and used herein to encompass various geometric forms, such as squares, trapezoids, cylinders, lenticular shapes, cylinders with diagonal faces, flakes, chunks, and substantially spherical shapes including a particle of powder or a larger-size sphere. While thermoplastic resins are often sold as pellets, the resin could be in any shape or size suitable for use in the equipment used to form the final article.

The thermoplastic resin body is preferably a pellet. Thermoplastic resins are customarily manufactured as pellets for later processing into the desired article. The term "pellets" is understood and used herein to encompass various geometric forms, such as squares, trapezoids, cylinders, lenticular shapes, cylinders with diagonal faces, flakes, chunks, and substantially spherical shapes including a particle of powder or a larger-size sphere. While thermoplastic resins are often sold as pellets, the resin could be in any shape or size suitable for use in the equipment used to form the final article.

The thermoplastic resin body may comprise virtually any thermoplastic resin suitable for forming into articles by thermal processes, molding, extrusion, or other such processes that may be employed in the methods of the invention, with the proviso that the thermoplastic resin of the resin body must have an onset temperature for its melt processing range higher than the onset temperature of the melt processing range of the polymeric component of the outer coating layer. For example, and without limitation, the following thermoplastic materials may advantageously be used: acrylonitrile-butadiene-styrene (ABS), acetal resins such as polyoxymethylene, acrylics, acrylonitrile (AN), allyl resins, cellulosics, epoxies, polyarylether ketones, polyether etherketones (PEEK), phenolics, polyamides (nylons), including polyamide-6, polyamide-6,6, polyamide-6,10, and so on; polyimides, polyamide-imide resins, polyolefins (TPO, including polyethylene, polypropylene, and polybutylene homopolymers and copolymers; polycarbonates; polyesters, including polyalkylene terephthalates such as polybutylene terephthalate (PBT) and polyethylene terephthalate (PET); polyimides and polyetherimides; polyphenylene oxide; polyarylene sulfites such as polyphenylene sulfite; polyarylene sulfides such as polyphenylene sulfide; polyvinyl resins, including polystyrene (PS) and copolymers of styrene such as styrene-acrylonitrile copolymer (SAN) and acrylic-styrene-acrylonitrile copolymer (ASA), polyvinyl polymers including polyvinyl chloride (PVC) and polyvinylphenylene chloride; polyurethanes (TPU), and polysulfones, including polyarylether sulfones, polyether sulfones, and polyphenyl sulfones. Mixtures or block copolymers of two or more resins may also be used. Preferred materials for the thermoplastic resin body include polyesters, polyamides, polyolefins, polystyrenes and polystyrene copolymers, polyacetals, polycarbonates, acrylics, polyether etherketones, and mixtures of these. Polyesters, polyamides, polystyrenes and polystyrene copolymers, and mixtures of these are especially preferred.

The thermoplastic resin body of the present customized thermoplastic resins may also comprise a fibrous material. Such fibers may be included as reinforcing agents. Useful fibers include, without limitation, glass fibers, carbon and graphite fibers, polymeric fibers including aramide fibers, boron filaments, ceramic fibers, metal fibers, asbestos fibers, beryllium fibers, silica fibers, silicon carbide fibers, and so on. The fibers may be conductive and such conductive fibers, for example conductive carbon fibers or metal fibers, may be used to produce articles for conductive or static charge dissipative applications or EMI shielding. Among these, glass fibers, carbon fibers, and aramide fibers are preferred. Methods of preparing thermoplastic resins that include such fibers are well-known in the art. In one method, chopped glass fiber bundles are fed into the melting zone of the extruder that is being used to form the thermoplastic resin body, for instance by introducing the fiber tow or bundle through a feeding port.

The customizing coating or outer layer covers at least part of the thermoplastic resin body. In a preferred embodiment, the thermoplastic resin body is substantially encapsulated by the coating. By "substantially encapsulated" we mean that at least about three-quarters of the surface of the thermoplastic resin body is coated, and preferably at least about nine-tenths of the resin body is coated. It is particularly preferred for the coating to cover substantially all of the resin body. The coating of the customized thermoplastic resin has a thickness that will result in the desired weight ratio of coating composition to thermoplastic resin body composition when the two are melt blended in forming the final article. The weight ratio of coating to the thermoplastic resin may typically range at least about 0.1% by weight and up to about 10% by weight, based on the weight of the customized thermoplastic resin. Preferably, the coating is at least about 0.5% by weight and up to about 5% by weight, based on the weight of the customized thermoplastic resin. Thus, the coating thickness may depend upon such factors as the surface area of the thermoplastic resin body that is coated and the concentration of the additive or additives in the coating compared to the desired concentration in the final blend of the resin body and coating. For a typical cylindrical pellet, the coating may be up to an average of about 300 microns thick. In a preferred embodiment, the average thickness of the coating for such a pellet may be at least about 10 microns and up to about 200 microns.

The coating comprises a polymeric component and an additive component. The polymeric component comprises one or more resins or polymers. Examples of suitable materials for the polymeric component include, without limitation, the thermoplastic materials mentioned above as suitable for the resin body, waxes, and mixtures of these. In a preferred embodiment, the polymeric component is a crystalline material.

When the thermoplastic resin body contains a water-sensitive material, such as a polyamide, it is preferable that the coating contains a hydrophobic resin component as its polymeric component. It is thought that a hydrophobic polymer-based coating, such as a coating containing wax, will slow or prevent readsorption of water by a hydroscopic resin body. Examples of suitable materials for the hydrophobic resin component include, without limitation, waxes and mixtures of waxes. Waxes are generally defined as materials that are solid at ambient temperature, have relatively low melting points, and can soften when heated and harden when cooled. Useful waxes include, without limitation, naturally occurring waxes such as animal waxes, vegetable waxes, mineral waxes, and petroleum waxes, as well as synthetic waxes. Preferred among these are hydrocarbon waxes, such as paraffin waxes; polyalkylene homopolymers and copolymers, especially polyethylene, polypropylene, and copolymers of alkenes having from 2 to 10 carbon atoms, particularly copolymers of ethylene with alkenes having from 3 to 10 carbon atoms, especially copolymers of ethylene with propylene or butylene; microcrystalline waxes; carnuba waxes; montan waxes; Fischer-Tropsch waxes; fatty acids, especially those having from about 12 to about 18 carbon atoms, including stearic acid, palmitic acid, lauric acid, myristic acid, oleic acid, linoleic acid, and tall oil fatty acid, and derivatives of fatty acids including dimer fatty acids, fatty amides, fatty acid soaps such as zinc stearate, and esters of fatty acids; hydrogenated oils, such as hydrogenated castor oil; polyethers, including polyalkylene glycols such as polyethylene glycol, polypropylene glycol, and block copolymers of these; polytetrahydrofuran; and mixtures of these. Especially preferred are polyethylene waxes having molecular weights of preferably at least about 2000 and preferably below about 12,000; polypropylenes, ethylene copolymers, oxidized polyethylenes, montan ester waxes, polystyrenes and styrene copolymers, carnuba waxes, esters of fatty acids, and mixtures of these. Other suitable polymeric materials include polystyrenes and polystyrene derivatives, polyvinyl polymers including chlorinate polyvinyl polymers such as polyvinyl chloride, and mixtures of these.

The additive component of the coating includes at least one additive. Examples of suitable additives include, without limitation, plasticizers, thixotropes, optical brighteners, antioxidants, UV absorbers, hindered amine light stabilizers, hindered amide light stabilizers, heat stabilizers, flame retardants, pigments, colorants, conductive materials, non-fibrous reinforcements and particulate fillers such as talc, impact modifiers such as ionomers, maleated elastomers, and natural and synthetic rubber particles, processing aids such as lubricants, mold release agents, and slip agents, fragrances, antifoaming agents, antioxidants, antistatic agents, antimicrobials, biocides, and so forth. Surfactants and acids or bases used to salt ionic resins or polymers are not considered additives within the scope of the invention.

In one preferred embodiment the additive component of the coating comprises at least one pigment or colorant. Preferably, the pigment is present in an amount of up to about 8% by weight, and especially up to about 4% by weight, based on the weight of the customized thermoplastic resin. Suitable pigments are black, white, or color pigments, as well as extenders. Examples of useful pigments include, without limitation, titanium dioxide, zinc oxide, zinc sulfide, barium sulfate, aluminum silicate, calcium silicate, carbon black, black iron oxide, copper chromite black, yellow iron oxides, red iron oxides, brown iron oxides, ocher, sienna, umber, hematite, limonite, mixed iron oxides, chromium oxide, Prussian blue (ammonium ferrocyanide), chrome green, chrome yellow, manganese violet, cobalt phosphate, cobalt lithium phosphate, ultramarines, blue and green copper phthalocyanines, metallized and nonmetallized azo reds, gold, red, and purple quinacridones, mono-and diarylide yellows, naphthol reds, pyrrolo-pyrroles, anthraquinones, thioindigo, flavanthrone, and other vat pigments, benzimidazolone-based pigments, dioxazine, perylenes, carbazole violet, perinone, isoindoline, and so on.

Dyes may employed instead of a pigment or in addition to a pigment. For example, a dye may be used to produce a brighter color than would otherwise be obtained with a composition containing only pigments. Examples of useful dyes include, without limitation, azo dyes, such as Solvent Yellow 14 and Metanil Yellow; anthraquinone dyes, such as Solvent Red 111, Solvent Blue 56, and Solvent Green 3; xanthene dyes, such as Rhodamine B, Sulfo Rhodamine, Sovent Green 4, Acid Red 52, Basic Red 1, and Sovent Orange 63; azine dyes, such as induline and nigrosines; fluorescent dyes, Brilliant Sulfoflavine (Acid Yellow 7), Sovent Orange 60 (a perinone dye), basic triphenylmethane dyes, such as methyl violets and victoria Blue B, and quinoline yellows.

Conductive materials include conductive pigments, such as certain grades of carbon black and graphite. The carbon black may function as both a conductive material and a colorant. Such conductive materials may be incorporated into the coating composition according to usual methods of incorporating fillers or pigments, which will now be generally described with particular reference to pigments.

The pigment may be dispersed in the carrier, which is the polymeric component or one of the resins of the polymeric component, by a two-step process. In a first step, the pigment agglomerates are broken into smaller particles. In a second step, the air at the surface of the pigment particles is displaced with resin to "wet out" the pigment and thereby fully develop its color shade and strength. One method of dispersing the pigment in resin or polymeric component is to first tumble the pigment with granules of the resin and then obtain a intimate mixture by processing the tumbled blend in a roller mill, Banbury mixer, intensive mixer, or single- or twin-screw extruder.

The dispersed colorant may be a conventional color concentrate or a liquid color. If a liquid color is used, it must be employed at a low enough level to be encapsulated by the polymeric component so that the coating is solid at ambient temperatures. Typical color concentrates may include one or more thermoplastic resins and one or more pigments. Examples of suitable thermoplastic resins include, without limitation, waxes, such as the examples listed hereinabove; polyolefins, polystyrenes, and polyvinyl chloride resins. The thermoplastic resin of the color concentrate forms, or forms a part of, the polymeric component of the coating. The pigment may be any of those known in the art, such as those listed hereinabove, and mixtures of such pigment. Conventional color concentrates may be in the form of pellets, cubes, beads, wafers, or micro-beads. Color concentrates may have a pigment loading of from about 10% by weight to about 80% by weight, typically from about 30% by weight to about 60% by weight, based upon the weight of the color concentrate. Preferably, the color concentrate has a pigment loading of up to about 80% by weight, and preferably at least about 50% by weight. The pigment concentration will vary, depending upon the selection of pigment and carrier. Liquid colors typically have pigment loadings of from about 10% up to about 80%.

It is particularly preferred for the coating to comprise at least one color concentrate. The color concentrate may be prepared according to known means, with at least one pigment and optionally with additional additives such as antioxidants, and used as the coating in preparing the customized resins of the invention. Alternatively, two or more color concentrates may be blended to obtain the desired color and applied as the coating of the invention. Color concentrates are readily commercially available from a number of companies, including ReedSpectrum, Holden, Mass.; Unifor Color Company, Holland, Mich.; Americhem Inc., Cuyahoga Falls, Ohio; and Holland Colors Americas Inc., Richmond, Ind.

The thermoplastic resin body may also include one or more additives. When the same additive is present in the thermoplastic resin body composition and in the thermoplastic coating layer, then the coating composition may be used to increase the amount of additive in order to customize the level of that additive over that of the base resin. When the additive that is present in the coating is not present in the thermoplastic resin body composition, then the addition of a layer of the coating may be used to customize the pellet by including an additive not in the body resin. The coating preferably includes at least one additive that is not included in the thermoplastic resin body. In one particularly preferred embodiment, the thermoplastic resin body is unpigmented—that is, it contains substantially no pigment or colorant—and the coating comprises at least one pigment or colorant.

The polymeric component of the coating must have an onset temperature for its melt processing range that is below the onset temperature of the melt processing range of the thermoplastic resin body. Thus, the coating melt comprising the polymeric component may be applied as a melt to the thermoplastic resin body composition while the latter is a solid or substantially a solid. The onset temperature of the melt processing range of the polymeric component of the coating is preferably above about 20° C., and more preferably it is above about 60° C., and even more preferably it is at least about 80° C. The onset temperature of the melt processing range of the polymeric component of the coating preferably has an onset temperature for its melt processing range at least about 20° C. below, and even more preferably at least about 40° C. below, the onset temperature for the melt processing range of the thermoplastic resin body. If the customized thermoplastic resin pellets are to be dried using a dryer, then the melt processing range of the polymeric component is preferably above the temperature of the dryer. In a preferred embodiment, the coating encapsulating the thermoplastic resin pellet is chosen to prevent or slow water absorption so that a drying step before forming the desired article is unnecessary.

The onset temperature of the melt processing range of the coating composition containing the polymeric component should be below the onset temperature of the melt processing range of the thermoplastic body composition A lower onset temperature of the melt processing range may be obtained by using a different class of polymeric material, for example by using a nylon composition for the thermoplastic resin body composition and a polyethylene composition as the coating composition, or by using resins within the same class of polymeric material that have different processing temperature ranges due to different molecular weight, plasticization with lower melting materials, or by using different monomers in synthesizing the resin that tend to lower its processing temperature range. For example, the thermoplastic resin body composition may comprise a polyolefin resin and the coating composition may also comprise a polyolefin, but with the polyolefin of the coating having a lower onset temperature of the melt processing range.

The thermoplastic resin or resins that are included in the polymeric component of the coating preferably have no harmful effect on any resin of the thermoplastic resin body composition. For example, the polymeric component should have no resin that is incompatible with a resin of the thermoplastic resin body composition at the expected processing temperatures at which the customized resin will be used to form the final article. One example of such a harmful interaction would result from a combination of polyvinyl chloride and nylon in which generation of HCl from the PVC during processing could lead to degradation or discoloration of the nylon. A second example of an undesirable interaction would be a tranesterification or transamidification between a nylon and a polyester. Another example of an undesirable interaction would be stratification of two resins during the step of forming the final article due to incompatibility. While it is not preferred to use resin combinations that have such interactions, even an otherwise undesirable resin may be used in the coating composition in small amounts, such as less than about 5% by weight and especially less than about 3% by weight, based upon the total weight of the customized thermoplastic resin.

For convenience, but without limitation, the customized thermoplastic resins of the present invention will hereinafter generally be described in terms of a pellet shape, even though other shapes are contemplated, as mentioned above.

In a preferred process for producing the customized thermoplastic resin of the invention, unmodified thermoplastic resin and, optionally, one or more additives such as UV stabilizers or processing aids are charged to a hopper and fed into a single-screw or twin-screw extruder. A hot feed of glass or mineral reinforcements and, optionally, impact modifier may be introduced into the extruder melt zone, if desired. The extrudate from the die may be cooled, for example in a water bath, and then pelletized according to customary methods to produce the thermoplastic resin body. In the case of a thermoplastic resin that is susceptible to yellowing, the extrudate is preferably quickly cooled to a temperature below the melting point range, preferably to a temperature below about 150° C., and preferably to a temperature of not less than about 60° C. In general, coating compositions having low melt processing ranges are preferred for thermoplastic resins that tend to yellow. Pellets based upon hydroscopic thermoplastic materials should be allowed to dry before being coated.

After forming, the pellets may then be coated by several different methods. In one method, the pellets are placed in a container with the coating composition while the pellets are still at a temperature above the onset temperature of the melt processing range of the coating composition. In this case, the coating composition may be already melted or may be melted by the heat of the pellets or by heat applied externally to the container. For example, without limitation, the coating may be introduced to the container as a powder when it is to be melted in the container. It is preferred, particularly if the coating composition is not melted before being brought into contact with the pellets, that the coating composition have an onset temperature for its melt processing range that is below the temperature of the pellets in the container, which will usually be above about 60° C. and up to about 150° C. The contents of the container are mixed, for example by tumbling or with a paddle blade or auger blade. Additional heat may be applied to the container as necessary to obtain the desired coating of the pellets with the coating composition. The coated pellets are then cooled by use of a cooling jacket with stirring of the contents of the container, direct application of cooling air to the pellets into the container or to the pellets after they are taken from the container, or by contacting the pellets with a non-reacting coolant such as liquid nitrogen or dry ice. The pellets may be tumbled or stirred during cooling so that they do not clump together. The pellets are preferably cooled to a temperature at which the coating is hardened for easy removal of the pellets from the container and may be cooled further as necessary before packaging.

In a second method for applying the coating to the pellets, the pellets, after exiting the pelletizer and while still hot, are conveyed into a zone where the coating composition is applied as a melt (that is, without solvent). The coating composition may be applied by spraying, provided that the composition is of a suitable viscosity for the spray equipment or applied by powder coating methods. The coating is preferably applied as a hot melt. Although it is not necessary to apply the coating to all surfaces of the pellet, care must be taken (as is true for each method of applying the coating layer) to apply an adequate amount of the coating composition so that the desired weight ratio of coating to pellet is achieved. Overspray (that is, sprayed coating composition that does not become deposited on a pellet) may be collected, re-melted, and re-sprayed. The molten coating composition may also be dribbled onto the pellets instead of sprayed on. In the second method, the coating composition may also be applied by conveying the pellets through a molten bath of the coating composition. The pellets may be conveyed through the molten bath by means of, for example and without limitation, a conveyor belt or by batch dipping, such as in a porous metal basket.

It is also possible to allow the pellets to cool completely and then to heat the pellet to a desired temperature again before coating. Such reheating could be accomplished with, for example, hot air or radiant heat. Thus, the pellets that become the thermoplastic resin body of the customized thermoplastic resins of the invention could be produced and stored for a period of time, then re-heated and coated at a later time to form the customized thermoplastic resin.

In some cases, it may be beneficial to cool the pellets below the onset temperature of the melt processing range of the coating composition. For example, in the processes previously described in which molten coating composition is applied to the resin pellets, it may be possible by using cooled pellets to hasten cooling and hardening of the coating being applied. For example, it may be desirable to use pellets that are at room temperature or below to increase the thickness of the coating layer that may be applied or to hasten production of the coated pellets.

In yet another method of coating the pellets, the pellets and coating composition are charged to a fluidized bed reactor, roller mill, ball mill (with the pellets replacing the steel balls), or disperser equipped with a flat impeller along with the coating. It is also possible to charge the pellets and the individual coating components of the polymeric component, such as a polyolefin wax, and the additive component, consisting, for example of one or more pigments or colorants and/or optionally one or more other additives. The materials are then processed at a temperature at which the coating or the polymeric component is a melt but at which the pellets remain solid. This may be accomplished by adding the coating or polymeric component as a melt, by applying heat to the processing container after the ingredients are loaded, by the heat generated from the friction and shearing of the materials during processing, or by any combination of these. After processing for a sufficient time to produce a substantially homogeneous coating on the pellets, the coated pellets are cooled, preferably with stirring or tumbling to prevent the pellets from clumping as the coating solidifies.

The coated pellets, or customized thermoplastic resin, of the invention may be formed into articles according to any of the methods known in the art for thermal melt processing of thermoplastic resin compositions. For example, compression molding, vacuum molding, injection molding, thermoforming, blow molding, calendering, casting, extrusion, filament winding, laminating, rotational or slush molding, transfer molding, lay-up or contact molding, stamping, and combinations of these methods may be used with the customized thermoplastic resins formed by the present methods.

The customized thermoplastic resins of the invention may be formed into any of the articles generally made with thermoplastic resins. Among the many possibilities are, without limitation, chair bases, electrical connectors and housing, automotive component including speaker grills, mirror housings, and fluid reservoirs, power tool housings, electrical appliance components such as refrigerator shelves and oven door handles, toys such as plastic building blocks, toothbrushes, and extruded films or layers.

The invention is further described in the following examples. The examples are merely illustrative and do not in any way limit the scope of the invention as described and claimed. All parts are parts by weight unless otherwise noted.

EXAMPLE

A coating composition is produced as follows: 35 parts by weight of phthalocyanine blue (Heliogen Blue K7090, available from BASF Corp., Mt. Olive, N.J.) is combined with 65 parts by weight Luwax 61 (melting point=103–111° C., available from BASF Corp., Mt. Olive, N.J.) in an open, divided trough kneader for 50 min. at 150° C. The mixture is allowed to cool, removed from the kneader, and then ground to a coarse powder.

A customized thermoplastic resin is prepared as follows: 70 parts by weight of nylon 6 (Ultramid® B3, available from BASF Corp., Mt. Olive, N.J.) is compounded with 30 parts by weight chopped glass fibers (chopped strands 3540 from PPG, Inc., Pittsburg, Pa.) on a ZSK 40 continuous twin-screw extruder (Werner & Pfleiderer) at 260° C. at a throughput of 80 kg/hr. Immediately upon exiting the die plate, the strands are run through a 36-inch water bath, after which they are blown with compressed air to remove excess water and then fed through a Scheer rotating-knife pelletizer. 50 kg of pellets are collected in a 55 gal. metal drum, mounted on drum tumbler. The temperature of the pellets are approximately 120° C. 1.5 kg of the coating composition prepared above is added to the drum, and the mixture is tumbled for about 1 hour until the coating composition has evenly coated the pellets and the pellet temperature has cooled to 60° C. The coated pellets are dried to a moisture content of 0.08% by weight of pellet.

The customized thermoplastic resin is then injection molded into tensile bars having a uniform blue coloration and excellent appearance and physical properties.

The invention has been described in detail with reference to preferred embodiments thereof. It should be understood, however, that variations and modifications can be made within the spirit and scope of the invention and of the following claims.

What is claimed is:

1. A method for customizing a thermoplastic resin, comprising the steps of:
    (a) providing a thermoplastic resin body that is at a first temperature;
    (b) applying, to at least a portion of said thermoplastic resin body, a thermoplastic coating composition comprising an additive component, the additive component comprising a pigment present in an amount of from about 3% to 8% by weight, based on the weight of the customized thermoplastic resin and a polymeric component, wherein said coating composition has a melt processing range and further wherein said first temperature is above the onset temperature of the melt processing range of the coating composition;
    (c) cooling the coated thermoplastic resin to solidify the coating to produce a customized thermoplastic resin.

2. A method according to claim 1, wherein the coating composition comprises a powder.

3. A method according to claim 2, wherein the powdered coating composition is sprayed on the thermoplastic resin body.

4. A method according to claim 2, wherein the powdered coating composition is applied to the thermoplastic resin body in a fluidized bed.

5. A method according to claim 1, further comprising a step of forming the thermoplastic resin body by means of extruding and pelletizing a thermoplastic resin.

6. A method according to claim 5, further comprising a step of maintaining the temperature of the pellets at or above the first temperature between the pelletizing step and the coating step.

7. A method according to claim 5, further comprising steps of cooling the pellets below the first temperature after the pelletizing step and then heating the pellets to the first temperature for the coating step.

8. A method according to claim 7, wherein said heating step is carried out using a heating means selected from the group consisting of dielectric heating, microwave heating, radiant heating, hot air heating, contact heating and combinations thereof.

9. A method according to claim 7, wherein the pellets are cooled to ambient temperatures after the pelletizing step.

10. A method according to claim 1, wherein the thermoplastic resin body comprises a polymeric material selected from the group consisting of polyesters, polyamides, polyolefins, polyurethanes, polystyrenes and polystyrene copolymers, polyacetals, polycarbonates, acrylics, polyether etherketones, and mixtures thereof.

11. A method according to claim 1, wherein the thermoplastic resin body comprises a polymeric material selected from the group consisting of polyesters, polyamides, polystyrenes and polystyrene copolymers, and mixtures thereof.

12. A method according to claim 1, wherein the polymeric component of the coating comprises at least one member of the group consisting of waxes and mixtures thereof.

13. A method according to claim 1, wherein the polymeric component of the coating comprises a hydrophobic material.

14. A method according to claim 1, wherein the polymeric component of the coating comprises at least one member of the group consisting of hydrocarbon waxes, polyalkylene homopolymers and copolymers of alkenes having from 2 to 10 carbon atoms, microcrystalline waxes, carnuba waxes, montan waxes, Fischer-Tropsch waxes, fatty acids having from about 12 to about 18 carbon atoms and derivatives thereof, and mixtures thereof.

15. A method according to claim 1, wherein the polymeric component of the coating comprises at least one member of the group consisting of polyethylenes, polypropylenes, copolymers of ethylene with alkenes having from 3 to 10 carbon atoms, carnuba waxes, fatty acids having from about 12 to about 18 carbon atoms andn derivatives thereof, montan waxes, and mixtures thereof.

16. A method according to claim 1, wherein the additive component further comprises at least one member selected from the group consisting of plasticizers, thixotropes, antioxidants, UV absorbers, optical brighteners, hindered amine light stabilizers, hindered amide light stabilizers, heat stabilizers, flame retardants, conductive materials, nonfibrous reinforcements, particulate fillers, impact modifiers, elastomers, natural and synthetic rubber particles, lubricants, mold release agents, slip agents, fragrances, antifoaming agents, antioxidants, antistatic agents, antimicrobials, biocides, and mixtures thereof.

17. A method according to claim 1, wherein the polymeric component of the coating is crystalline.

18. A method according to claim 1, wherein the polymeric component of the coating has an onset temperature for its melt processing range that is at least above about 20° C.

19. A method according to claim 1, wherein the polymeric component of the coating has an onset temperature for its melt processing range that is at least above about 60° C.

20. A method according to claim 1, wherein the polymeric component of the coating has an onset temperature for its melt processing range that is at least above about 80° C.

21. A method according to claim 1, wherein the first temperature is at least about 20° C. above the onset temperature of the melt processing range of the coating composition.

22. A method according to claim 1, wherein the first temperature is at least about 40° C. above the onset temperature of the melt processing range of the coating composition.

23. A method according to claim 1, wherein the first temperature is at least about 60° C.

24. A method according to claim 1, wherein the first temperature is up to about 150° C.

25. A method according to claim 1, wherein the thermoplastic resin body is unpigmented.

26. A method according to claim 1, wherein the thermoplastic resin body comprises at least one additive selected from the group consisting of plasticizers, thixotropes, antioxidants, UV absorbers, optical brighteners, hindered amine light stabilizers, hindered amide light stabilizers, heat stabilizers, flame retardants, pigments, colorants, conductive materials, nonfibrous reinforcements, particulate fillers, impact modifiers, elastomers, natural and synthetic rubber particles, lubricants, mold release agents, slip agents, fragrances, antifoaming agents, antioxidants, antistatic agents, antimicrobials, biocides, and mixtures thereof.

27. A method according to claim 1, wherein the thermoplastic resin body comprises a fibrous material.

28. A method according to claim 1, wherein the thermoplastic resin body comprises at least one material selected from the group consisting of glass fibers, carbon fibers, aramide fibers, and mixtures thereof.

29. A method according to claim 1, wherein the additive is up to about 80% by weight of the coating.

30. A method according to claim 1, wherein the thermoplastic resin body comprises an unpigmented polyamide resin.

31. A method according to claim 1, wherein the coating is up to about 300 microns thick.

32. A method according to claim 1, wherein the coating composition comprises a melt.

33. A method according to claim 32, wherein the coating step (b) is carried out by means of dipping the resin body into the molten coating composition.

34. A method according to claim 33, wherein the resin body is conveyed through the molten coating composition by means of a conveyor belt.

35. A method according to claim 33, wherein the resin body is placed inside a porous container and then dipped into the molten coating composition.

36. A method according to claim 32, wherein the molten coating composition is poured over the thermoplastic resin body.

37. A method according to claim 32, wherein the molten coating composition is sprayed on the thermoplastic resin body.

38. A method according to claim 1, wherein the coating step (b) is carried out in a container having mixing means.

39. A method according to claim 38, wherein the mixing means is a paddle blade.

40. A method according to claim 38, wherein the container having mixing means is an extruder.

41. A method according to claim 1, wherein the thermoplastic resin body is substantially encapsulated by the coating.

42. A method according to claim 1, wherein the thermoplastic resin body has a substantially cylindrical shape.

43. A method for producing an article, comprising the steps of:

(a) providing a thermoplastic resin body that is at a first temperature;

(b) applying, to at least a portion of said thermoplastic resin body, a thermoplastic coating composition comprising an additive component, the additive component comprising a pigment present in an amount of from about 3% to 8% by weight, based on the weight of the customized thermoplastic resin and a polymeric component, and a polymeric component, wherein said coating composition has a melt processing range and further wherein said first temperature is above the onset temperature of the melt processing range of the coating composition;

(c) cooling the coated thermoplastic resin body below the onset temperature of the melt processing range of the coating composition to produce a customized thermoplastic resin;

(d) heating the customized thermoplastic resin to above the onset temperature of the melt processing range of the resin body;

(e) mixing the resin body and the coating composition to form a substantially uniform mixture;

(f) forming an article from the mixture.

44. A method according to claim 43, wherein the mixing step (e) is carried out in an extruder.

45. A method according to claim 43, wherein the forming step (f) is carried out by means selected from the group consisting of compression molding, vacuum molding, injection molding, thermoforming, blow molding, calendering, casting, extrusion, filament winding, laminating, rotational or slush molding, transfer molding, lay-up or contact molding, stamping, and combinations thereof.

* * * * *